United States Patent
Bing et al.

(10) Patent No.: US 11,917,083 B2
(45) Date of Patent: Feb. 27, 2024

(54) AUTOMATED METHODS AND SYSTEMS FOR PERFORMING HOST ATTESTATION USING A SMART NETWORK INTERFACE CONTROLLER

(71) Applicant: VMware LLC, Palo Alto, CA (US)

(72) Inventors: Niu Bing, Beijing (CN); Jin He, Beijing (CN); Jinheng Xu, Beijng (CN); Li He, Beijing (CN); Juan Liu, Beijing (CN); Xiangjun Song, Beijing (CN)

(73) Assignee: VMware LLC, Palo Alto, CA (US)

( * ) Notice: Subject to any disclaimer, the term of this patent is extended or adjusted under 35 U.S.C. 154(b) by 107 days.

(21) Appl. No.: 17/666,046

(22) Filed: Feb. 7, 2022

(65) Prior Publication Data
US 2023/0188362 A1    Jun. 15, 2023

(30) Foreign Application Priority Data
Dec. 15, 2021   (WO) ................ PCT/CN2021/138247

(51) Int. Cl.
*H04L 9/32* (2006.01)
(52) U.S. Cl.
CPC ................................ *H04L 9/3268* (2013.01)
(58) Field of Classification Search
CPC ..... H04L 9/3268; H04L 9/0825; H04L 9/321; H04L 9/3247; H04L 2209/127; G06F 21/00; G06F 21/57; G06F 21/74
See application file for complete search history.

(56) References Cited

U.S. PATENT DOCUMENTS

| | | | |
|---|---|---|---|
| 2011/0202983 A1* | 8/2011 | Pope ..................... | H04L 41/28 726/7 |
| 2020/0026858 A1* | 1/2020 | Subramanian .......... | G06F 21/64 |
| 2020/0097661 A1* | 3/2020 | Block .................... | H04L 9/3271 |
| 2020/0259799 A1* | 8/2020 | Li .......................... | H04L 9/0897 |
| 2021/0297259 A1* | 9/2021 | Rahn ..................... | H04L 9/3247 |
| 2022/0006637 A1* | 1/2022 | Nevis .................... | G06F 16/188 |
| 2022/0067221 A1* | 3/2022 | Schiattarella ......... | G06F 21/602 |
| 2023/0006981 A1* | 1/2023 | Syrivelis ............... | H04L 9/0852 |
| 2023/0144341 A1* | 5/2023 | Payne .................... | G06F 21/64 713/2 |

* cited by examiner

*Primary Examiner* — Michael Simitoski
*Assistant Examiner* — Hany S. Gadalla
(74) *Attorney, Agent, or Firm* — Quarles & Brady LLP

(57) ABSTRACT

This disclosure is directed to automated processes for attesting to trustworthiness of a host considered for connection to a data center network. The attestation process is performed in two attestation phases. In the first phase, attestation is performed on a smart network interface controller ("SNIC") connected to an internal bus of the host using a first trusted platform module ("TPM") of the SNIC. In the second phase, attestation is performed on the host by the SNIC using a second TPM connected to the internal bus of the host in response to a determination that the SNIC is trustworthy. The host is connected to the data center network in response to a determination by the SNIC that the host is trustworthy.

16 Claims, 12 Drawing Sheets

AUTOMATED METHODS AND SYSTEMS FOR PERFORMING HOST ATTESTATION USING A SMART NETWORK INTERFACE CONTROLLER

TECHNICAL FIELD

This disclosure is directed to attesting to trustworthiness or untrustworthiness of a host prior to connecting the host to a network of a data center.

BACKGROUND

Data centers are composed of networked server computers (also called "hosts") and storage appliances that are used to organize, process, and store large amounts of data. Data centers are made possible by advances in virtualization, computer networking, distributed operating systems and applications, data-storage appliances, computer hardware, and software technologies. In recent years, an increasing number of enterprises, governments, and other organizations now conduct business and provide cloud services over the Internet on platforms that are maintained and run entirely in data centers. For example, data centers have enabled private companies to move data processing and storage to the cloud, thereby reducing the cost of maintaining their own centralized computing networks and hosts. As a result, the size and complexity of data centers have grown to keep pace with the ever-increasing demand for cloud services. To aid system administrators manage the increasing size and complexity of data centers, centralized management utilities have been developed to automate management of virtual machines, hosts, and dependent components from a centralized location within each data center. The management utilities enable data centers to operate with greater efficiency and productivity.

Because data centers hold sensitive and proprietary information, such as customer data and intellectual property, data centers must be both digitally and physically secured. Managing the security of the underlying infrastructure of a data center has become increasingly more challenging with the increasing sophistication of hackers. For example, a host to be added to a data center infrastructure may arrive from a factory with a security misconfiguration, the host may contain potentially dangerous malware, or the host may have been tampered with in the data center. To mitigate security risks, a central management utility performs a host attestation service on to-be-added hosts to determine whether the host can be trusted with access to the data center network.

Ideally, the host attestation service determines the trustworthiness of a to-be-added host before the host is allowed to interact with customer data or workloads. However, prior to performing the host attestation service, a typical central management utility establishes a communication channel with the host, which means the central management utility must initially have some base level of trust in the integrity of the host before the host attestation service performs a protocol to determine trustworthiness of the host. Establishment of this communication channel prior to completing the attestation protocol exposes a serious security vulnerability that could create an opportunity for a security breach of a data center. For example, once the communication channel is established with a compromised host, the host may immediately upload malware or initiate a denial-of-service attack in the data center before the host attestation service has had an opportunity to verify trustworthiness of the host. Data center administrators and tenants seek automated methods and systems that perform a host attestation protocol that avoids establishment of vulnerable communication channels with to-be-added hosts.

SUMMARY

This disclosure is directed to automated processes and systems for attesting to trustworthiness of a host prior to connecting the host to a data center network. The attestation process is performed in two attestation phases. The host to be added to the data center network contains a trust platform module ("TPM") and a smart network interface controller ("SNIC") that, in turn, contains its own TPM. Initially, the host is isolated from the data center network. In the first phase of the attestation process, a security authority of the data center performs attestation of the SNIC using the TPM of the SNIC. The security authority is a component of a data center management server computer that receives attestation information from the SNIC and use the information to determine whether the SNIC is trustworthy. If the first phase reveals that the SNIC is not trustworthy, the security authority maintains isolation of the host by denying the host access to the data center network and displays an alert in a management interface of the data center indicating that the SNIC cannot be trusted and the host is denied access to the data center network. On the other hand, if the first phase reveals that the SNIC is trustworthy, the attestation process proceeds to the second phase of the attestation process. In the second phase, the security authority directs an attestation agent of the SNIC to perform attestation of the host while the security authority continues to deny the host access to the data center network. In other words, the host is isolated from the data center network during both attestation phases. In this phase, attestation is performed by the attestation agent using only the internal bus of the host, thereby preventing establishment of a vulnerable communication channel between the host and the security authority. After attestation of the host is completed by the attestation agent, the attestation agent forwards the attestation results to the security authority. If the attestation results indicate the host is trustworthy, the security authority automatically grants the host access to the data center network through the SNIC or the security authority displays an alert in a management interface of the data center indicating that the host is trustworthy, thereby enabling a systems administrator to perform the process of configuring the host for integration into the data center network. On the other hand, if the results produced by the attestation agent indicate the host is not trustworthy, the security authority continues to deny the host access to the data center network and displays an alert in the management interface of the data center indicating that the host cannot be trusted and the host is denied access to the data center network.

DETAILED DESCRIPTION

Figure 1:
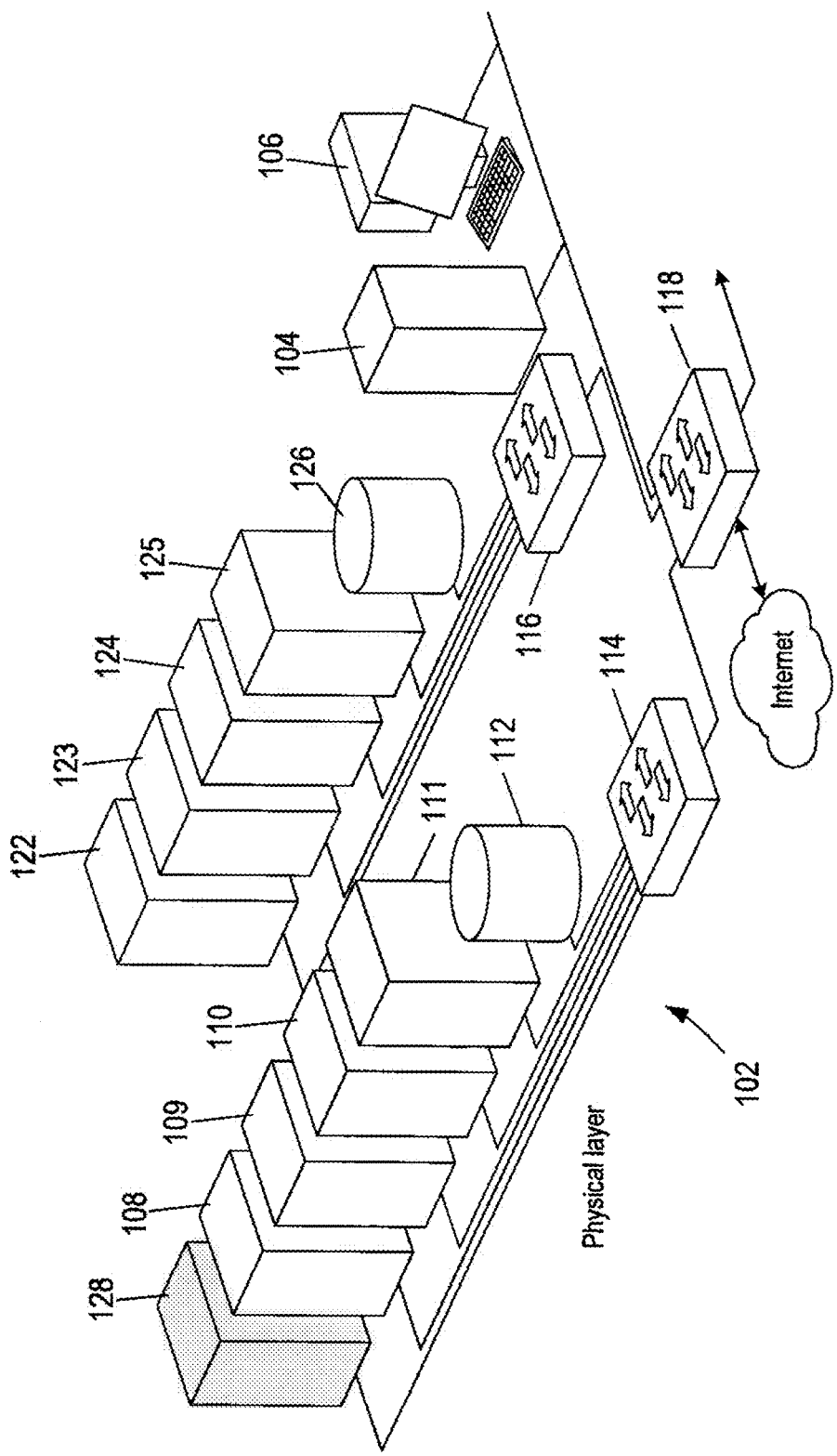
FIG. 1 shows an example of a data center and a host to be attested to before the host can be added to the data center.

This disclosure presents automated computer-implemented processes for attesting to the trustworthiness of hosts to be added to a network used by applications running in a data center. FIG. 1 shows an example of a data center 102. The data center 102 comprises a management server computer 104 and any of various computers, such as PC 106, on which a virtual-data-center management user interface may be displayed to system administrators and other users. Objects of the physical data center 102 additionally include server computers, called "hosts," such as hosts 108-111, mass-storage devices, such as a mass-storage device 112, switches 114 and 116, and a top of rack ("TOR") switch 118 that connects the server computers and mass-storage devices to the Internet, the virtual-data-center management server 104, the PC 106, and other server computers and mass-storage arrays (not shown). In the example of FIG. 1, each of the switches 114 and 116 interconnects four server computers and a mass-storage device to each other and connects the server computers and the mass-storage devices to the TOR switch 118. For example, the switch 114 interconnects the four server computers 108-111 and the mass-storage device 112 to the TOR switch 118 that is in turn connected to the switch 116, which interconnects four hosts 122-125 and a mass-storage device 126. The example physical data center 102 is provided as an example of a data center. Physical data centers may include a multitude of server computers, networks, data storage systems, and devices connected according to many different types of connection topologies.

FIG. 1 shows an example of a host 128 to be added to the network of the cluster of hosts 108-111 that are connected to the switch 114. When the host 128 is powered on, the host operating system broadcasts a message that identifies the host 128. The management server computer 104 receives the broadcast message and notifies a systems administrator receives with an alert displayed in the management user interface running on the computer system 106 that the host 128 is waiting to be connected to the network of the data center 102. In an alternative implementation, the management server computer 104 pings idle IP addresses to detect any unattested to host on the network of the data center. The management server computer 104 runs a security authority that performs an automated attestation process to determine the trustworthiness of the to-be-added host 128 as described below. The systems administrator starts the automated attestation process performed by the management server computer 104.

Figure 2:
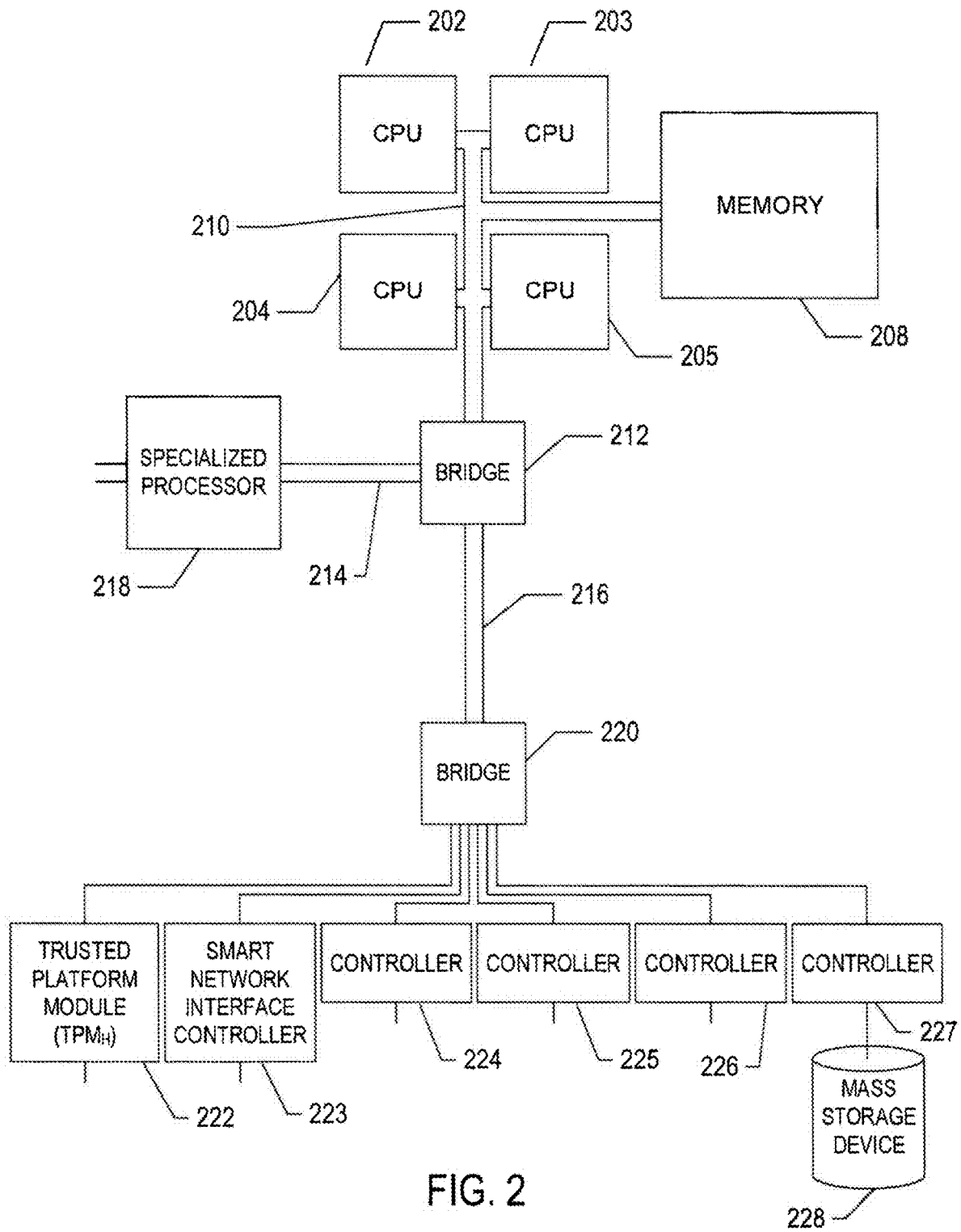
FIG. 2 shows an example architecture of a host to be added to the data center shown in FIG. 1.

FIG. 2 shows an example architecture of the to-be-added host 128. The host 128 contains one or multiple central processing units ("CPUs") 202-205, one or more electronic memories 208 interconnected with the CPUs by a CPU/memory-subsystem bus 210 or multiple busses, a first bridge 212 that interconnects the CPU/memory-subsystem bus 210 with additional busses 214 and 216, or other types of high-speed interconnection media, including multiple, high-speed serial interconnects. The busses or serial interconnections, in turn, connect the CPUs and memory with specialized processors, such as a graphics processor 218, and with one or more additional bridges 220, which are interconnected to a trusted platform module, a smart network interface controller ("SNIC") 223, and multiple controllers 224-227. The controllers 222-227 are connected to the bridge 220 with high-speed serial links, such as peripheral component interconnect express ("PCIe") serial expansion busses. The TPM 222 is a dedicated microcontroller, or chip, that is designed to secure hardware through integrated cryptographic keys. An example implementation of a TPM is described below with reference to FIG. 4. The controllers 223-227 are expansions cards that interface with different types of peripheral devices. The SNIC 223 is component that connects the host 128 to a network of the data center. An example implementation of the SNIC 223 is described below with reference to FIG. 3. The controller 227 interfaces with a computer-readable medium 228. The other controllers can interface with electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the host 128 to interact with human users. The computer-readable medium 228 is a data-storage device, including electronic memory, optical or magnetic disk drive, a magnetic tape drive, USB drive, flash memory and other such data-storage device. The computer-readable medium 228 can be used to store machine-readable instructions that encode the computational methods described below for performing attestation and can be used to store encoded data, during store operations, and from which encoded data can be retrieved, during read operations, by computer systems, data-storage systems, and peripheral devices.

Figure 3:
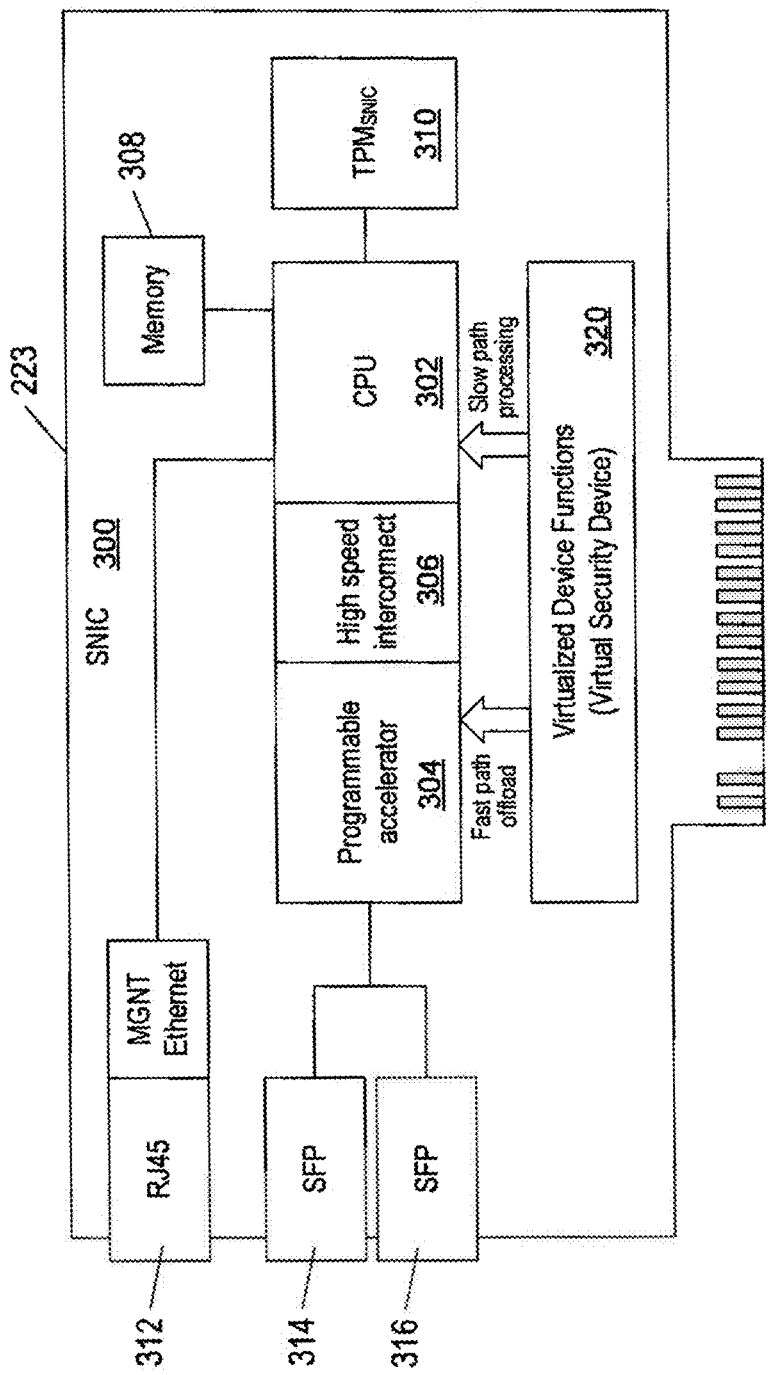
FIG. 3 shows an example architecture of a smart network interface controller ("SNIC") of the host shown in FIG. 2.

FIG. 3 shows an example architecture of the SNIC 223 shown in FIG. 2. The SNIC 223 includes a CPU 302 that is connected to a programmable accelerator 304 via a high-speed interconnect 306 mounted on a printed circuit board 300. The SNIC 223 includes memory 308 and a TPM 310 that are mounted on the circuit board and connected to the CPU 302. In this example, the CPU 302 is connected to a RJ45 modular ethernet connector 312. The programmable accelerator 304 is connected to two small form-factor pluggable ("SFP") connectors 314 and 316 that may be used to connect with fiber-optic cables. The circuit board 300 includes an array of pins 318 that are inserted into an electrical connector, or expansion slot, of a mother board of the host 128. The SNIC 223 includes non-volatile memory that stores virtual device functions, such as a virtual network adapter that provides high performance in virtual machines ("VMs") running on the SNIC 223. The attestation process performed by the SNIC 223 as described below is performed by a virtual security device ("VSD") run in a VM on the SNIC 223.

As shown in FIG. 2 and FIG. 3, the host 128 has a TPM 222 and the SNIC 223 has TPM 310. In order to distinguish the functions performed by the TPM 222 from the TPM 310 in the discussion below, the TPM 222 is denoted by $TPM_H$, where the subscript "H" identifies the host 128, and the TPM 310 is denoted by $TPM_{SNIC}$, where the subscript "SNIC" identifies the SNIC 223. The $TPM_H$ and $TPM_{SNIC}$ are microcontrollers that may be implemented in a chip or an expansion card. For example, $TPM_H$ may be implemented as an expansion card inserted into an expansion slot of the mother board of the host 128 while the $TPM_{SNIC}$ may be implemented as a chip that is mounted on the printed circuit board 300 of the SNIC 223.

Figure 4:
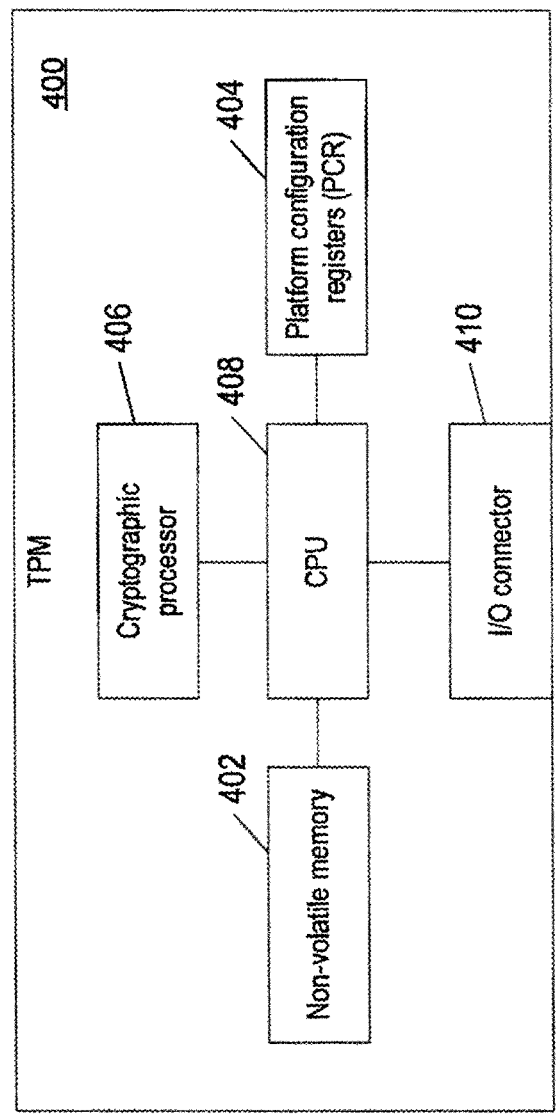
FIG. 4 shows an example architecture of a trust platform module.

FIG. 4 shows an example architecture of a TPM 400 that represents an example configuration of the $TPM_H$ and $TPM_{SNIC}$. The TPM 400 includes non-volatile memory 402, platform configuration registers ("PCRs") 404, a cryptographic processor 406, a CPU 408, and an I/O connector 410, such as pins for connecting to a circuit board. The TPM 400 may also include volatile memory to temporary store data. The TPM 400 has its own internal firmware and logic circuits represented by the CPU 408 to process instructions. As a result, the TPM 400 does not rely on an operating system, and the TPM 400 is not exposed to vulnerabilities that might exist in an operating system or application software. In other implementations, the CPU 408 may be omitted and the non-volatile memory 402, PCRs 404, and the cryptographic processor 406 incorporate the firmware and are connected to a single bus that leads to the I/O connector 410.

Figure 5:
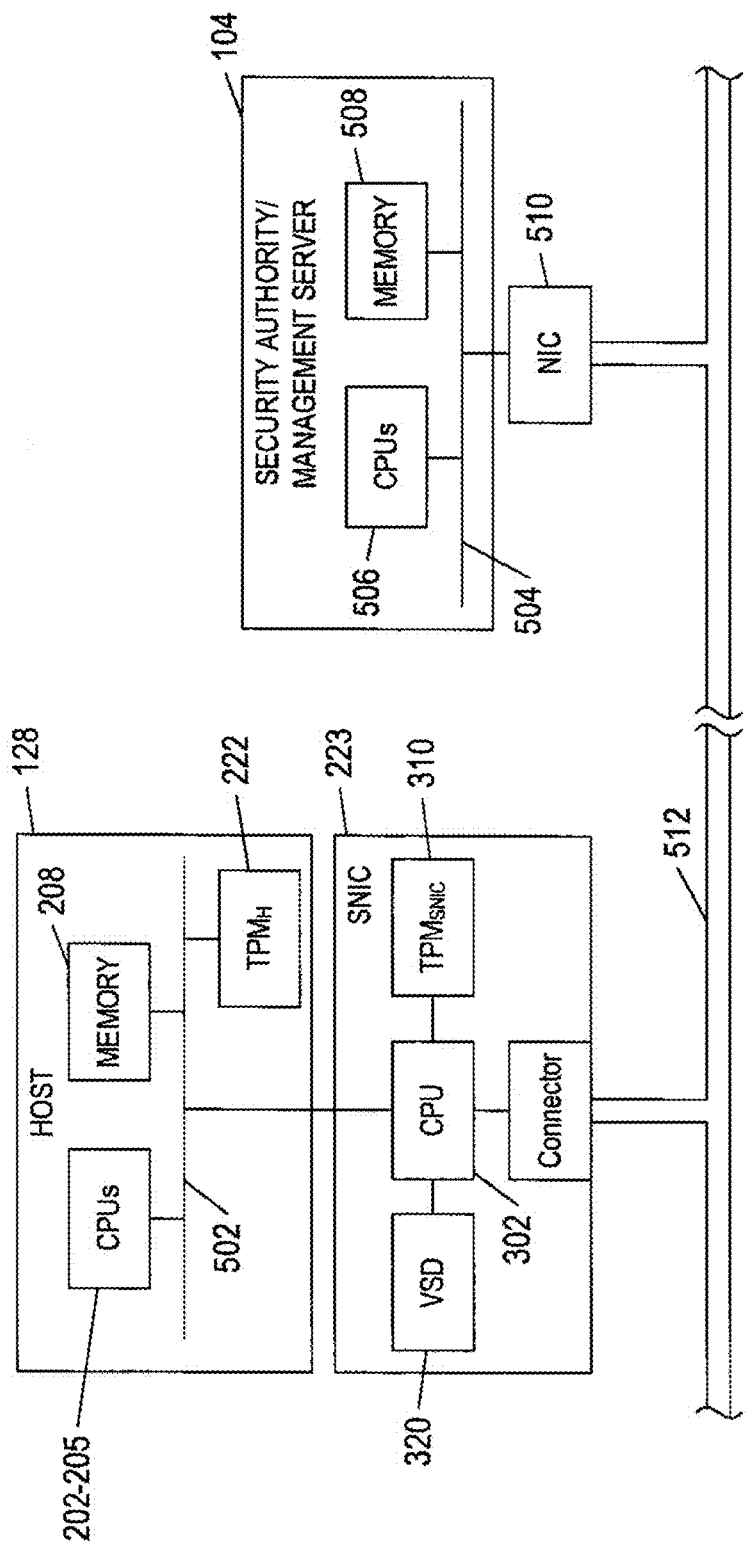
FIG. 5 shows a high-level architecture of the to-be-added host, the SNIC, and a management server computer that runs a security authority.

FIG. 5 shows a high-level architecture of the to-be-added host 128, the SNIC 223, and the management server computer 104 that runs the security authority. The security authority is a software component that may be run in a virtual machine of the management server computer 104. In one implementation, the security authority can be a library or class that runs in the control plane of the data center or run as an agent outside the control plane. In another implementation, the security authority can be a embedded in hardware of the management server computer 104. The host 128 has an internal bus 502 that connects the SNIC 223 to components of the host 128. The management server computer 104 has an internal bus 504 that connects CPUs 506, memory 508, and a standard network interface controller ("NIC") 510. The SNIC 223 and the NIC 510 are connected by a network communication channel 512, such as an ethernet cable or optical fiber. The VSD 320 is a virtualized security device that includes a software agent that performs automated attestation of the SNIC 223. The VSD 320 collects status information of the host 128 for attestation and facilitates automated attestation of the host 128.

The attestation process described herein is performed in two attestation phases. In the first phase, the security authority performs attestation of the SNIC 223 using the $TPM_{SNIC}$, hardware configuration, and software signature of the SNIC 223. An example implementation of the first phase of the attestation process is described below with reference to FIGS. 6A-6B. If the first phase reveals that the SNIC 223 is not trustworthy, the security authority maintains isolation of the host 128 by denying the host 128 access to the data center network. The security authority displays an alert in the management interface of the computer system 106 indicating that the SNIC 223 of the host 128 cannot be trusted and the host 128 is denied access to the data center network. On the other hand, if the first phase reveals that the SNIC 223 is trustworthy, the attestation process proceeds to the second phase. An example implementation of the second phase of the attestation process is described below with reference to FIGS. 7-9.

In the second phase, the security authority directs the attestation agent of the SNIC 223 to perform attestation of the host 128 while the security authority continues to deny the host 128 access to the data center network. In other words, the host 128 is isolated from the data center network during attestation of the host 128, attestation is performed by the SNIC 223 on the internal bus 502 of the host 128, which prevents establishment of a vulnerable communication channel between the host 128 and the security authority. After attestation of the host 128 has been completed by the attestation agent of the SNIC 223, the attestation agent forwards the attestation results to the security authority. If the attestation results indicate the host 128 is trustworthy, the security authority automatically grants the host 128 access to the data center network through the SNIC 223 or the security authority displays an alert in the management interface of the computer system 106 indicating that the host 128 is trustworthy, thereby enabling a systems administrator to perform the process of configuring the host 128 for integration into the data center network. On the other hand, if the results indicate the host 128 is not trustworthy, the security authority 104 continues to deny the host 128 access to the data center network and displays an alert in the management interface of the computer system 106 indicating that the host 128 cannot be trusted and is denied access to the data center network. Communications between the SNIC 223 and the security authority are carried out over a communication channel protected by transport layer security ("TSL").

The communication channel established between the SNIC 223 and the security authority to perform attestation of the SNIC 223 in the first phase of attestation is a much lower risk vulnerability to attack on the data center than the conventional process of performing attestation directly between the host 128 and the security authority for the following reasons. First, the SNIC 223 runs a highly controlled and limited amount of software that is not open-source software. As a result, in order to stage an attack on the data center from the SNIC 223, the limited amount of software run on SNIC 223 would have to be reverse engineered. Second, unlike the host 128 which runs workloads, a host operating system, and guest operating systems of VMs, which are all vulnerable to malware attacks, the SNIC 223 does not run workloads and such operating systems, which makes the SNIC 223 a much smaller target for attacks.

Figure 6A:
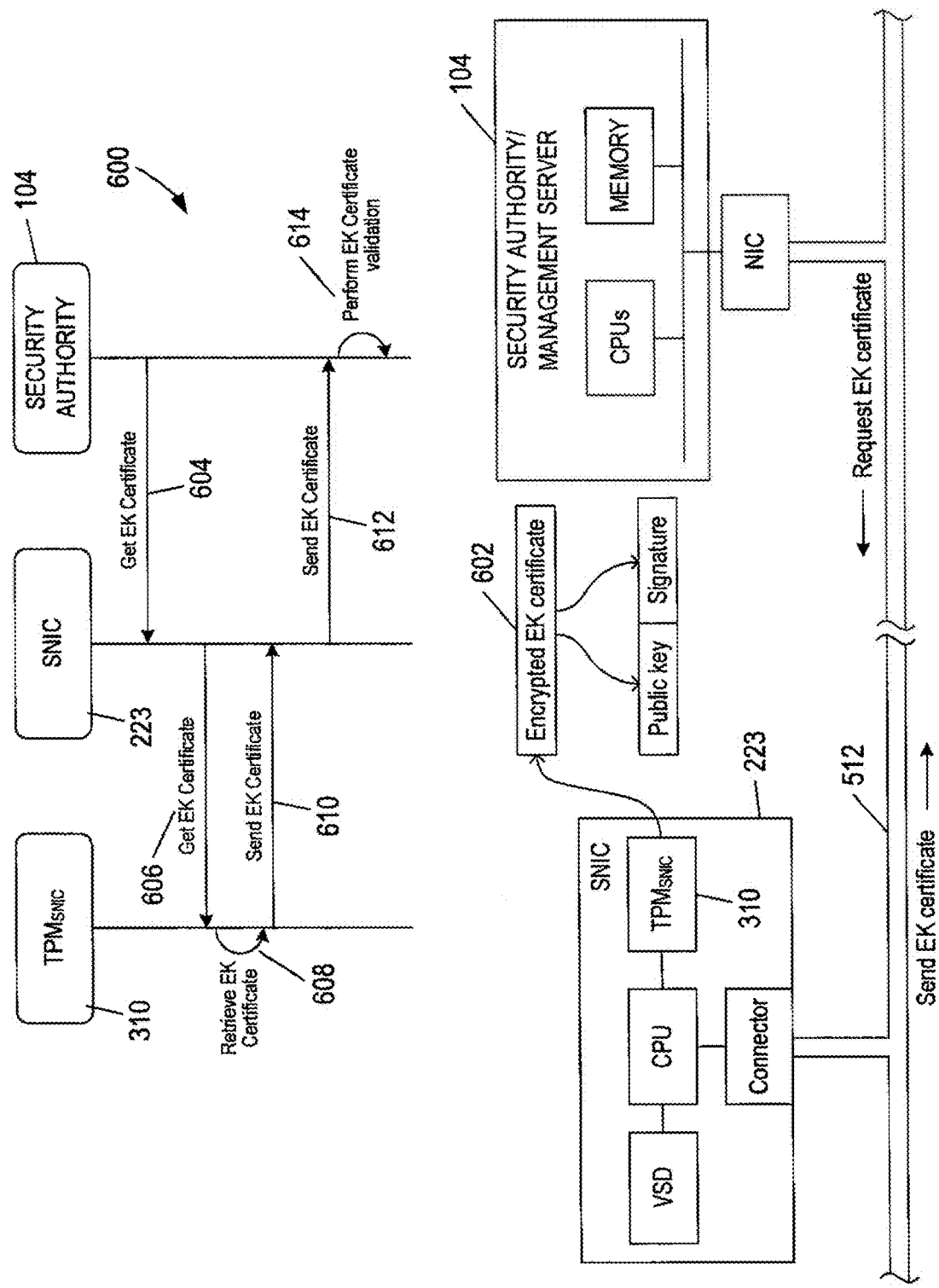
FIGS. 6A-6B show flow diagrams of a process of performing a first phase of attestation of the SNIC by the security authority.
Figure 6B:
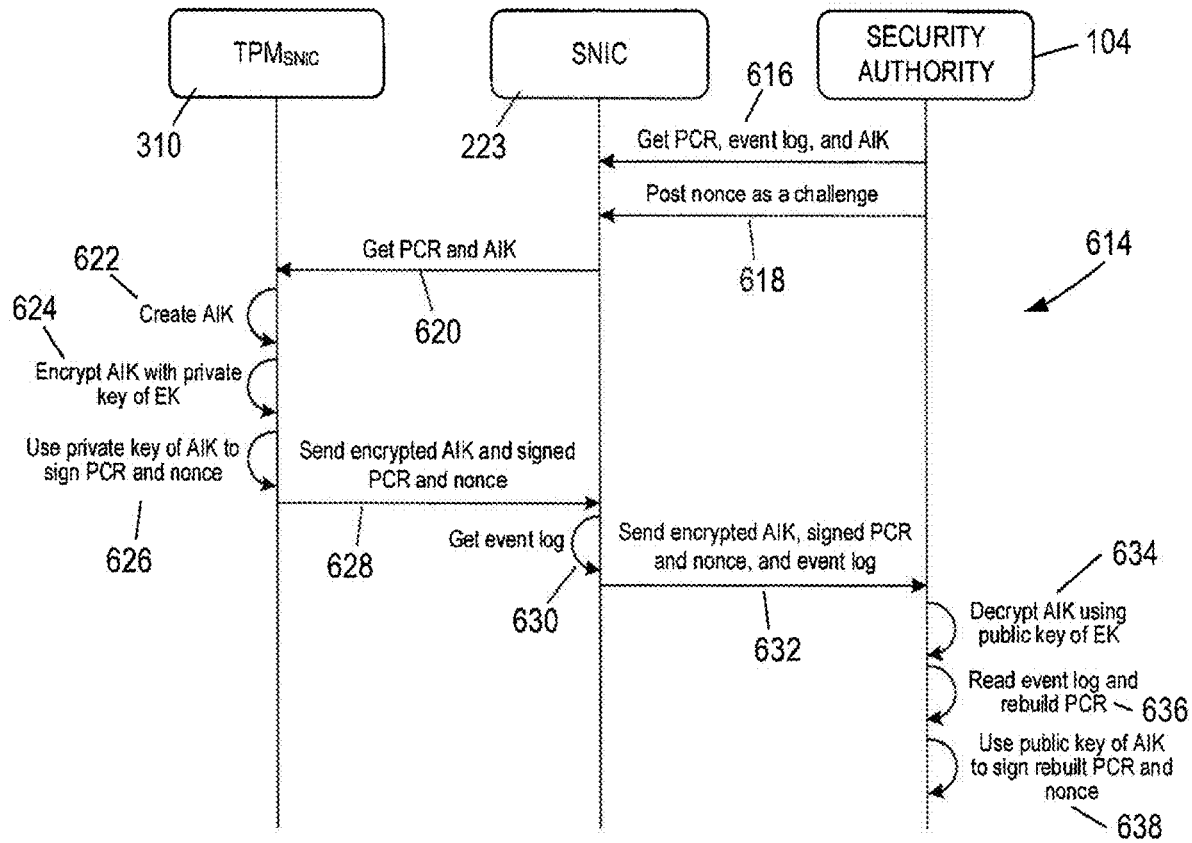
Figure 6B:
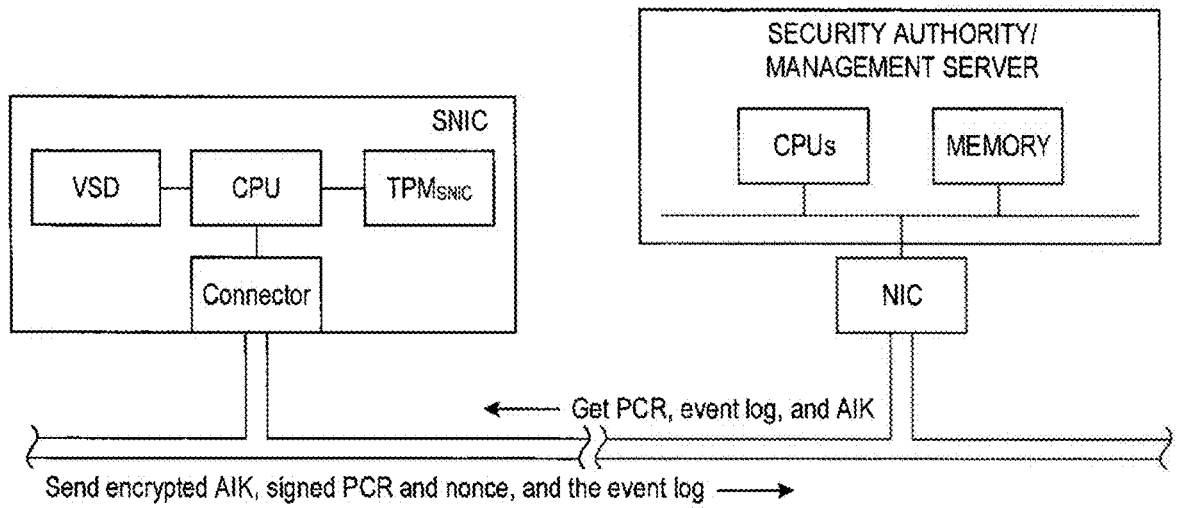

FIGS. 6A-6B show an example implementation of a process of performing the first phase of attestation of the SNIC 223 by the security authority of the management server computer 104. The first phase is performed in two stages. FIG. 6A shows a flow diagram 600 of the first stage of the first phase. In the first stage, the security authority requests an endorsement key ("EK") certificate 602 from the $TPM_{SINC}$ 310 of the SNIC 223 and verifies that the EK certificate is authentic. An EK certificate 602 comprises a public key and a signature of a manufacturer of the $TPM_{SINC}$ 310 and is permanently stored in the non-volatile memory 402 of the $TPM_{SINC}$ 310 at the time of manufacture. As shown in the flow diagram 600, the security authority requests 604 the EK certificate from the SNIC 223. In response to the request 604, an attestation agent of the SNIC 223 requests 606 the EK certificate 602 from the $TPM_{SINC}$ 310. The $TPM_{SINC}$ 310 responds to the request 606 using the TPM software stack ("TSS"), which is a software specification that provides an API for retrieving 608 the EK certificate 602 from the non-volatile memory 402 of the $TPM_{SINC}$ 310. The $TPM_{SINC}$ 310 sends 610 the EK certificate to the SNIC 223. The SNIC 223 sends 612 the EK certificate to the security authority. In response to receiving the EK certificate, the security authority performs EK certificate validation 614. The security authority contains the public key of the manufacturer of the $TPM_{SNIC}$ 310 and the signature of the manufacturer. For example, a systems administrator may have preloaded the security authority with the public key and the signature of the manufacturer of the $TPM_{SNIC}$ 310 prior to performing attestation. The security authority compares the public key and signature of the manufacture of the $TPM_{SNIC}$ 310 with the public key and signature of the EK certificate provide by the $TPM_{SNIC}$ 310. If the security authority determines that the public keys and signatures match, the process flows to the second stage of the first phase of attestation of the SNIC 223. On the other hand, if the security authority determines that the public keys and signatures do not match, the attestation process stops and the host 128 is denied access to the data center network.

FIG. 6B shows a flow diagram 614 of the second stage of the first phase. In the second stage, the security authority requests a platform configuration register ("PCR") value, an attestation identification key ("AIK") from the $TPM_{SNIC}$ 310 and an event log from the SNIC 223. The PCR value, denoted by $PCR_{SNIC}$, is stored in the PCR 402 of the $TPM_{SINC}$ 310 and are used to validate the contents of an event log stored in the memory 308 of the SNIC 223. Examples of events recorded in the event log of the SNIC 223 include loading of BIOS bootloader, operation system ("OS"), and other software or applications onto the host 128. The event log also records system boot flow events of the SNIC 128. When events are added to the event log of the SINC 223, a digest of each event is extended using a hash function to a PCR based on the $PCR_{SINC}$ index, or value, associated with the event. A value is extended to a PCR by hash coding the value with a hash function. As a result, the PCR accumulates hash results that correspond to the events in the event log and the contents of the PCR are hash accumulations. For example, an OS loads a module with a version and supplier information and extends the signature of the module as a hash to a PCR. The PCR value (i.e., $PCR_{SINC}$) of the PCR register 404 is an accumulated hash that reflects platform status and can be used for attestation. The contents of the PCR cannot be changed directly. The attestation agent of SNIC 223 may record more than one PCR, such as a PCR just for OS related events.

In FIG. 6B, the security authority submits a request 616 to the SNIC 223 for the $PCR_{SINC}$, an AIK, and the event log of the SNIC 223. The security authority also sends a nonce 618 as a challenge to the SNIC 223. The nonce is a number, such as a random number denoted by $nonce_{SNIC}$, generated by the security authority. The $nonce_{SNIC}$ is not repeated for attestations of other hosts. In response to receiving the request 616, the attestation agent of the SNIC 223 submits a request 620 for the $PCR_{SNIC}$ and the AIK to the $TPM_{SINC}$ 310. The AIK is derived from the EK stored in the $TPM_{SINC}$ 310. The AIK is constructed by the $TPM_{SNIC}$ 310 when attestation starts and is destroyed by the $TPM_{SNIC}$ 310 when attestation of the SNIC 223 is completed. The $TPM_{SINC}$ 310 constructs 622 the AIK using the Rivest-Shamir-Adleman ("RSA") algorithm. The AIK includes a public key. The $TPM_{SINC}$ 310 uses RSA encryption and a private key of the EK to encrypt 624 the public key of the AIK denoted by Enc(AIK public key, EK private key). The $PCR_{SNIC}$ value and the $nonce_{SNIC}$ are concatenated to obtain a concatenated string, $strcat(PCR_{SNIC}, nonce_{SNIC})$. The $TPM_{SNIC}$ 310 uses the RSA function given by $$R(x,k)=x^k (\text{mod } n)$$

where x, k, and n are different integers, and the private key of the AIK to sign 626 the concatenated string strcat $(PCR_{SNIC}, nonce_{SNIC})$ as follows:

$$\text{Sign}(strcat(PCR_{SNIC}, nonce_{SNIC}),k)=R(strcat(PCR_{SNIC}, nonce_{SNIC}),k)$$

where k equals the private key of the AIK. The $TPM_{SINC}$ 310 sends 628 the encrypted public key of the AIK and the signed concatenated string $strcat(PCR_{SNIC}, nonce_{SNIC})$ to the SNIC 223. The attestation agent of the SNIC 223 retrieves 630 the event log of the SNIC from memory and sends 632 the encrypted public key of the AIK, signed concatenated string $strcat(PCR_{SNIC}, nonce_{SNIC})$, and the event log to the security authority. The security authority decrypts 634 the public key of the AIK using RSA decryption and the public key of the EK provided by the manufacture of the $TPM_{SNIC}$ to obtain the public key of the AIK. The security authority reads the event log and rebuilds the $PCR_{SNIC}$ 636 from the event log using the same hash function used to construct the $PCR_{SNIC}$ of the $TPM_{SNIC}$ 310. For example, the security authority rebuilds the $PCR_{SNIC}$ by reading the indices, or values, associated with the versions and supplier information of events recorded in the event log and hashing the indices, or values, to rebuild the accumulated hash value $PCR_{SNIC}$ denoted by $rPCR_{SNIC}$. The security authority concatenates the rebuilt $rPCR_{SNIC}$ and the $nonce_{SNIC}$ originally sent to the SNIC 223 to obtain concatenated string strcat $(rPCR_{SNIC}, nonce_{SNIC})$ and signs 638 the concatenated string $strcat(rPCR_{SNIC}, nonce_{SNIC})$ as follows:

$$\text{Sign}(strcat(rPCR_{SNIC}, nonce_{SNIC}),K)=R(strcat(rPCR_{SNIC}, nonce_{SNIC}),K)$$

where K equals the decrypted public key of the AIK. If the signed string $\text{Sign}(strcat(rPCR_{SNIC}, nonce_{SNIC}),K)$ does not match the signed string $\text{Sign}(strcat(PCR_{SNIC}, nonce_{SNIC}),k)$ received 632 from the SNIC 223, then the security authority continues to deny the host 128 access to the data center network. If the signed string $\text{Sign}(strcat(rPCR_{SNIC}, nonce_{SNIC}),K)$ matches the signed string $\text{Sign}(strcat(PCR_{SNIC}, nonce_{SNIC}),k)$ received 632 from the SNIC 223, then the security authority identifies the SNIC 223 as trustworthy, and the attestation process proceeds to phase two.

When the security authority 104 has determined that the SNIC 223 is a trusted entity, the security authority designates the SNIC 223 to serve as a proxy for the security authority in performing phase two of the attestation of the host 128. In other words, the second phase of the attestation procedure is performed on the internal bus of the host 128 between the SNIC 128 and the CPUs 202-205 of the host 128 and is limited to the physical boundaries of the host 128. Such isolation ensures that an attack on the data center 128 cannot originate from the host 128 prior to completion of the attestation process.

Figure 7:
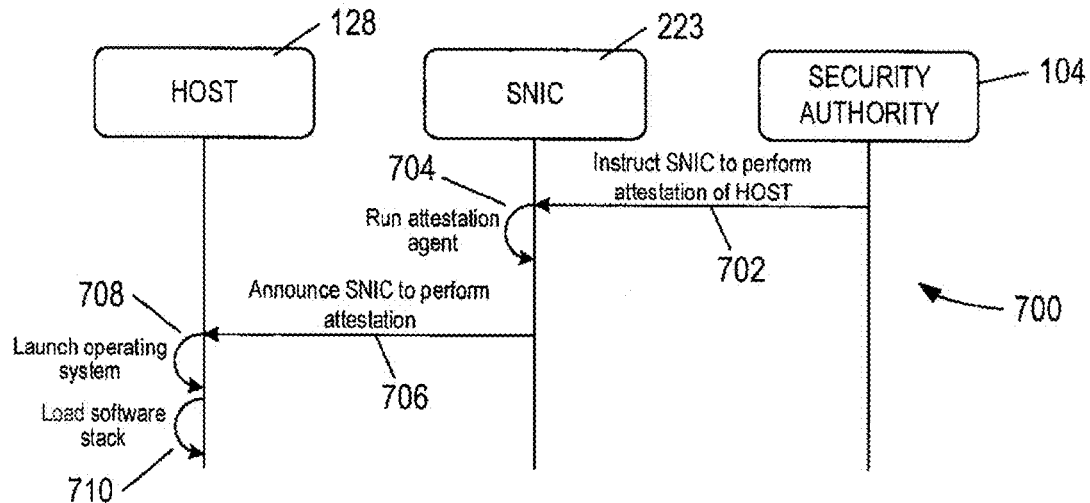
FIG. 7 shows a flow diagram of the security authority passing attestation of the host to the SNIC of the host.
Figure 7:
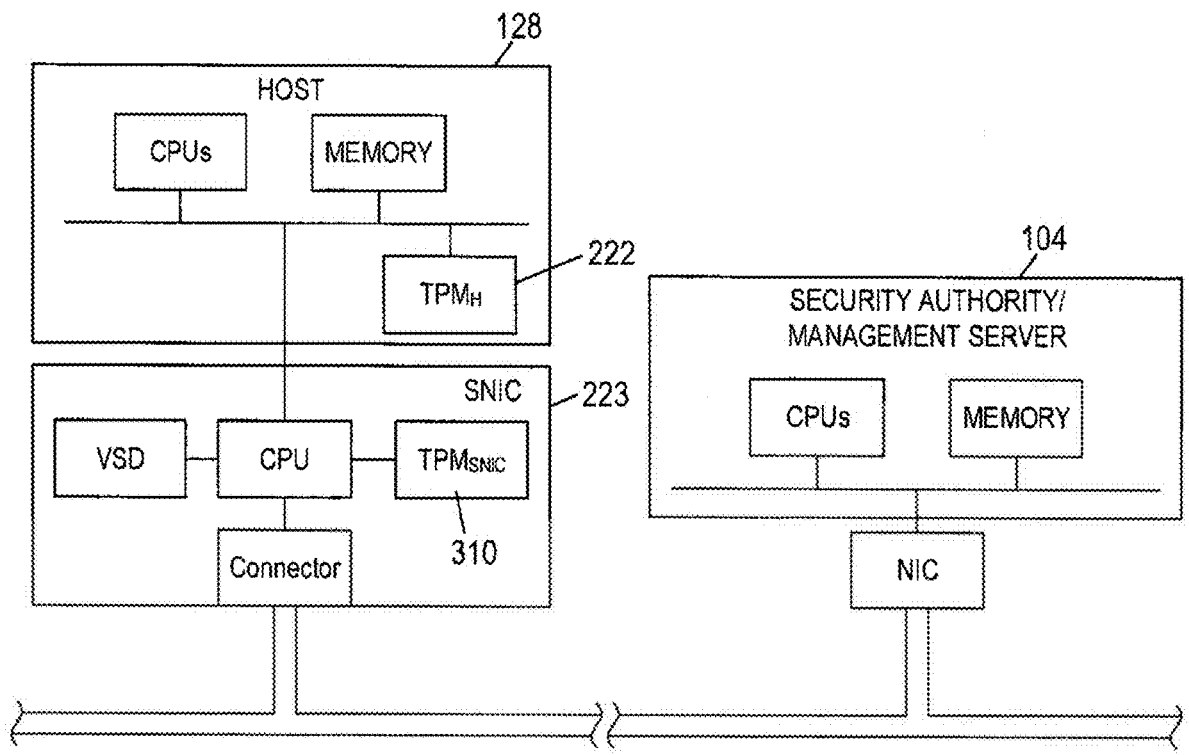

FIG. 7 shows a flow diagram 700 of the security authority interaction with the SNIC 223 after the SNIC 223 has been determined to be trustworthy at the completion of phase one of the attestation process. The security authority instructs 702 the SNIC 223 to perform attestation of the host 128. Upon receiving the instruction 702 from the security authority, the attestation agent of the SNIC 223 performs 704 the phase two process of determining whether the host 128 is trustworthy for access to the data center network. The attestation agent of the SNIC 223 announces itself 706 to the host 128 on the internal bus 502. For example, the attestation agent sends a PCIe hot plugin event so that the OS of the host 128 can load the driver and software for the SNIC 223. A virtual security device of the SNIC 223 announces itself to the host 128. In response to the announcement, the host 128 launches 708 the host operating system and loads 710 a software stack. The software stack is a set of software subsystems or components that create a complete platform that supports the running of applications on the host 128.

Figure 8A:
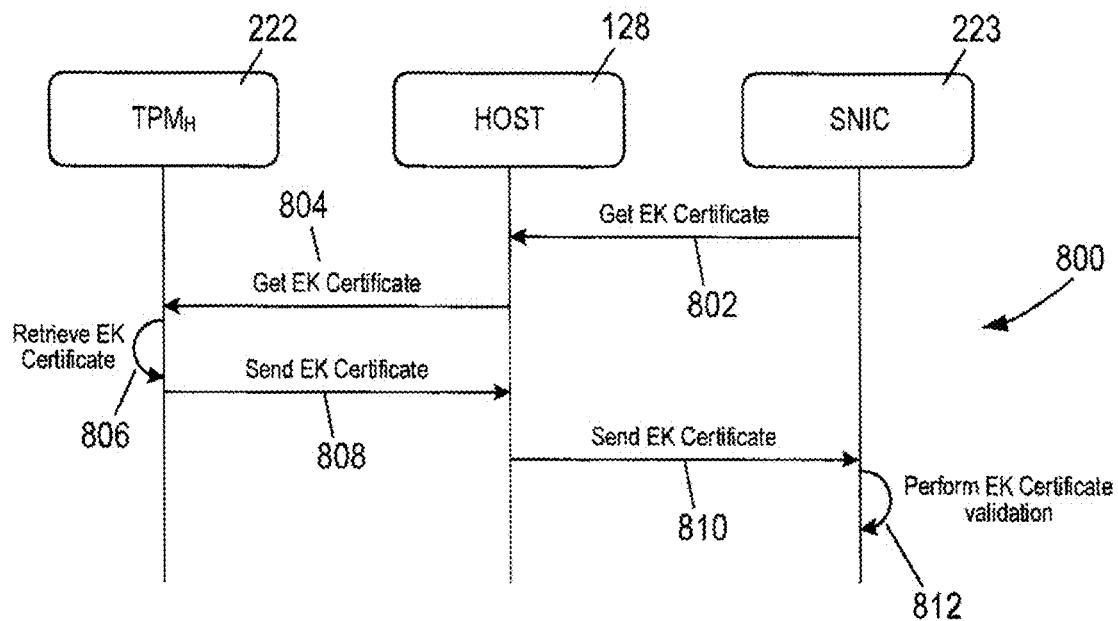
FIGS. 8A-8B show flow diagrams of a process of performing a second phase of attestation of the host by the SNIC.
Figure 8A:
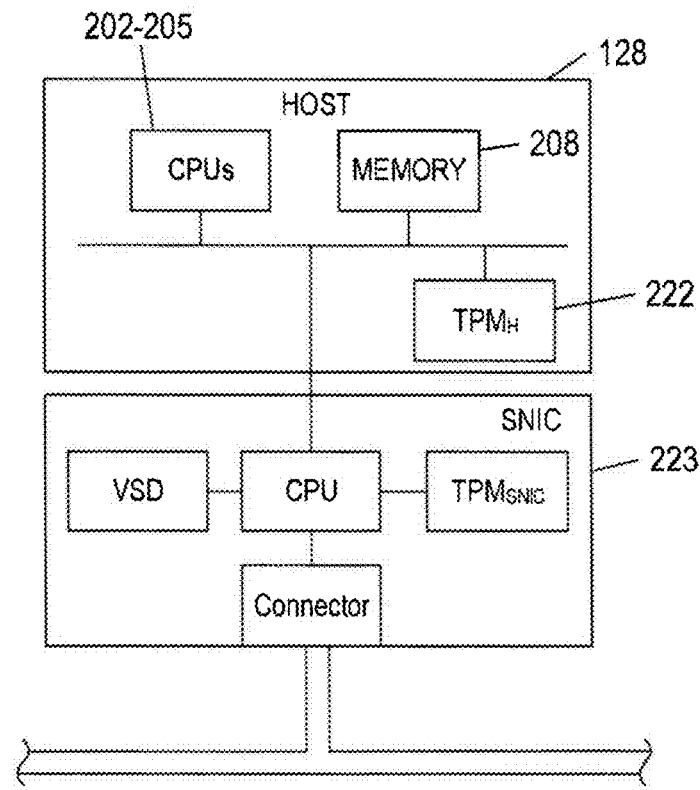
Figure 8B:
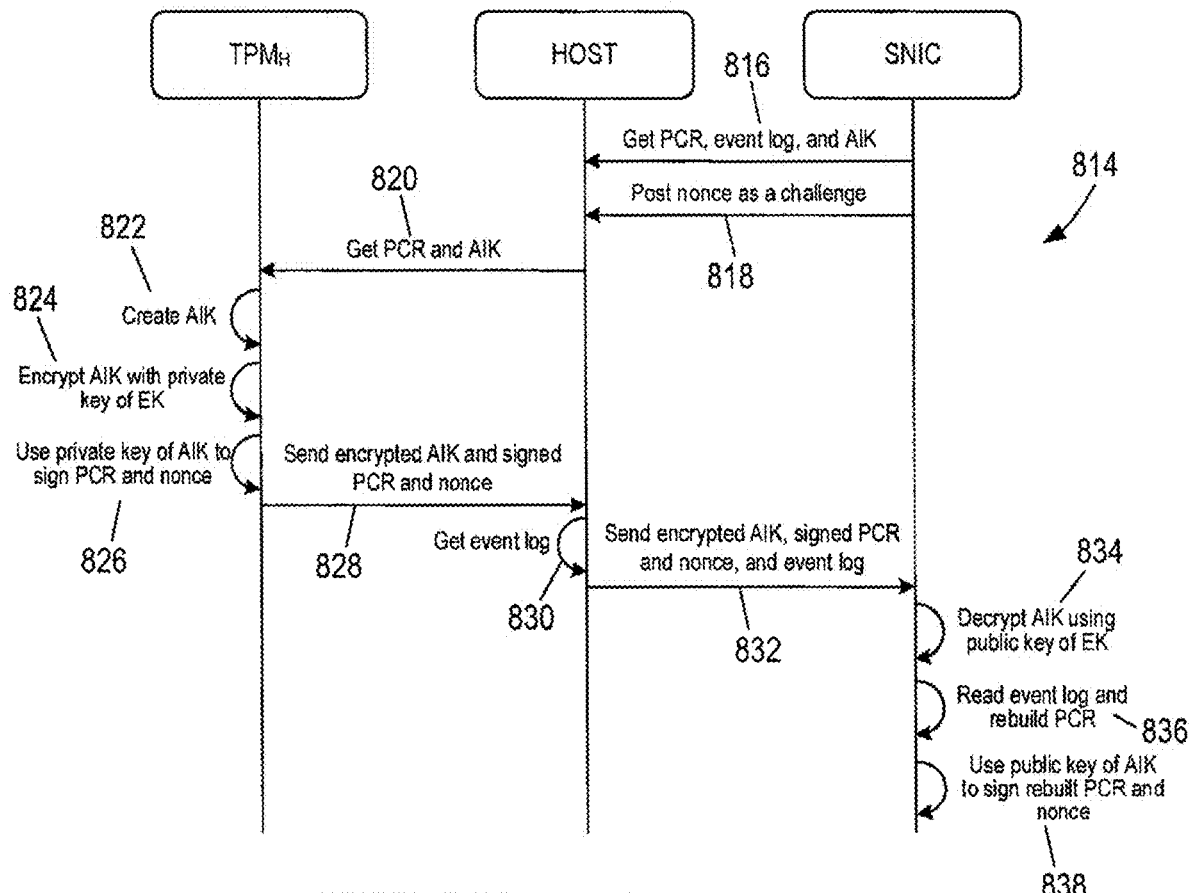
Figure 8B:
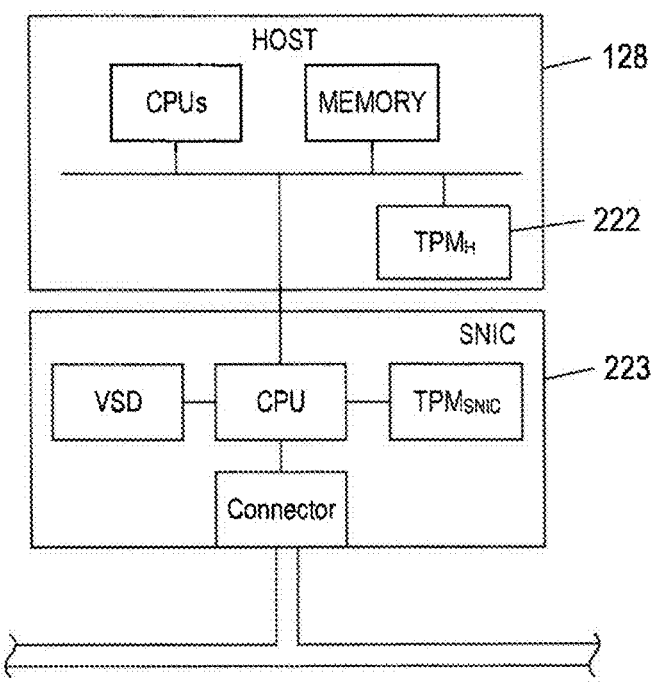

FIGS. 8A-8B show an example implementation of a process of performing the second phase of attestation of the host 128 by the SNIC 223. The second phase is performed in two stages. FIG. 8A shows a flow diagram 800 of the second stage of the second phase. In the second stage, the attestation agent of the SNIC 223 request an EK certificate from the $TPM_H$ 222 of the host 128 and verifies that the EK certificate is legitimate. The EK certificate contains a public key and signature of the $TPM_H$ 222 manufacture and is stored in the non-volatile memory 402 of the $TPM_H$ 222. A software emulated virtualized security device of the SNIC 223 requests 802 the EK certificate from the host 128. Software modules running in the host 128, such as a virtual security device, request the EK certificate from the $TPM_H$ 222 and send the EK certificate to the attestation agent of the SNIC 223. For example, the $TPM_H$ 222 responds to the request 804 using the TSS of the $TPM_H$ 222, which is a software specification that provides an API for retrieving 806 the EK certificate from the non-volatile memory 402 of the $TPM_H$ 222. The $TPM_H$ 222 returns 808 the EK certificate to the host 128. Software modules of the host 128 forward 810 the EK certificate to the SNIC 223. In response to receiving the EK certificate, the attestation agent performs EK certificate validation 812 using the public key of the manufacturer of the $TPM_H$ 222. The SNIC 223 can obtain the public key of the manufacturer by requesting the public key from the security authority after receiving the EK certificate or the security authority sends the public key to the SNIC 223 along with the request to perform attestation of the host 128. If the attestation agent of the SNIC 223 determines that the public key and signature of the EK certificate provided by the $TPM_H$222 matches the public key and signature of the manufacturer of the $TPM_H$ 222, the process flows to the second stage of the second phase of attestation of the host 128. On the other hand, if the attestation agent determines that the public key and signature of the EK certificate provided by the $TPM_H$ 222 do not match the public key and signature of the manufacturer of the $TPM_H$ 222, the attestation process stops and the host 128 is denied access to the data center network.

FIG. 8B shows a flow diagram 814 of the second stage of the second phase. In the second stage, the virtualized security device of the SNIC 223 requests 816 a $PCR_H$, an AIK, and an event log of the host 128, where subscript H denotes the host 128. The $PCR_H$ is an accumulated hash and is stored in a shielded location in the PCR 404 of the $TPM_H$ 222 and is used to validate the contents of an event log stored in the memory or disk of the host 128. The event log records BIOS bootloader, operation system ("OS"), and other software or applications onto the host 128. The event log of the host 128 records system boot flow events of the host 128. The attestation agent of the SNIC 223 sends a nonce, denoted by $nonce_H$, 818 as a challenge to the host 128. The $TPM_H$ 222 constructs 822 the AIK using the RSA algorithm. The AIK includes a public key. The $TPM_H$ 222 uses RSA encryption and a private key of the EK to encrypt 824 the AIK. The $TPM_H$ 222 concatenates the $PCR_H$ value and the $nonce_H$ to obtain a concatenated string $strcat(PCR_H, nonce_H)$ as described above. The $TPM_H$ 222 uses the RSA function and the private key of the AIK to sign 826 the string strcat $(PCR_H, nonce_H)$ as described above for the $TPM_{SINC}$ 310. The $TPM_H$ 222 sends 828 the encrypted AIK and the signed string $strcat(PCR_H, nonce_H)$ to the SNIC 223. The software modules of the host 128 retrieves 830 the event log of the host 128 from memory or disk and sends 832 the encrypted AIK, signed string $strcat(PCR_H, nonce_H)$, and the event log to the SNIC 223. The attestation agent decrypts 834 the AIK using RSA decryption and the public key of the EK provided by the manufacture of the $TPM_H$ 222 to obtain the public key of the AIK. The attestation agent reads the event log and rebuilds the $PCR_H$ 836 from the event log using the same hash function used to construct the PCR of the $TPM_H$ 222. For example, the attestation agent rebuilds the PCR by reading the indices, or values, associated with the versions and supplier information of each event recorded in the event log and hashing the indices, or values, to rebuild the hash values in the PCR denoted by $rPCR_H$. The attestation agent concatenates the rebuilt $rPCR_H$ and the $nonce_H$ originally sent to the host 128 to obtain concatenated string strcat $(rPCR_H, nonce_H)$ The attestation agent uses the public key of the AIK to sign 838 the string $strcat(rPCR_H, nonce_H)$. If the signed string $strcat(rPCR_H, nonce_H)$ does not match the signed string $strcat(PCR_H, nonce_H)$ received from the host 128, then the attestation agent determines that the host 128 is not trustworthy. If the signed string $strcat(rPCR_H, nonce_H)$ matches the signed string $strcat(PCR_H, nonce_H)$ received from the host 128, then the attestation agent identifies the host 128 as trustworthy. The attestation agent generates a report of the results of the attestation process performed on the host 128.

Figure 9:
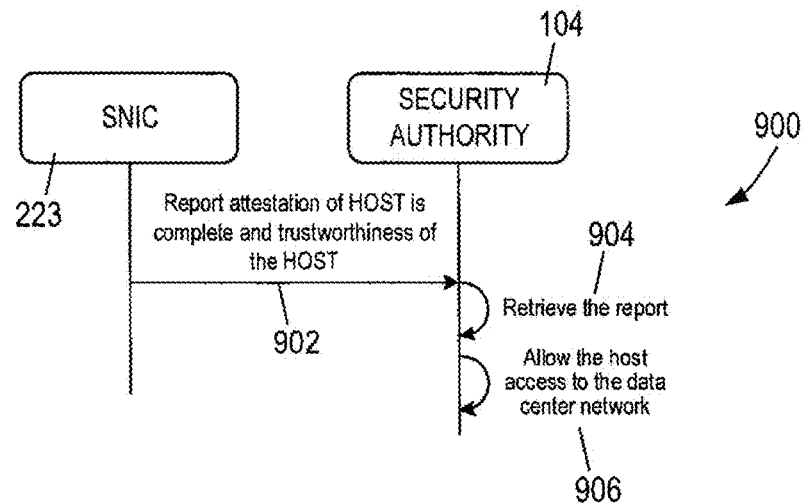
FIG. 9 shows a flow diagram of a process in which the SNIC a report of the results of the attestation of the host is sent to the security authority.
Figure 9:
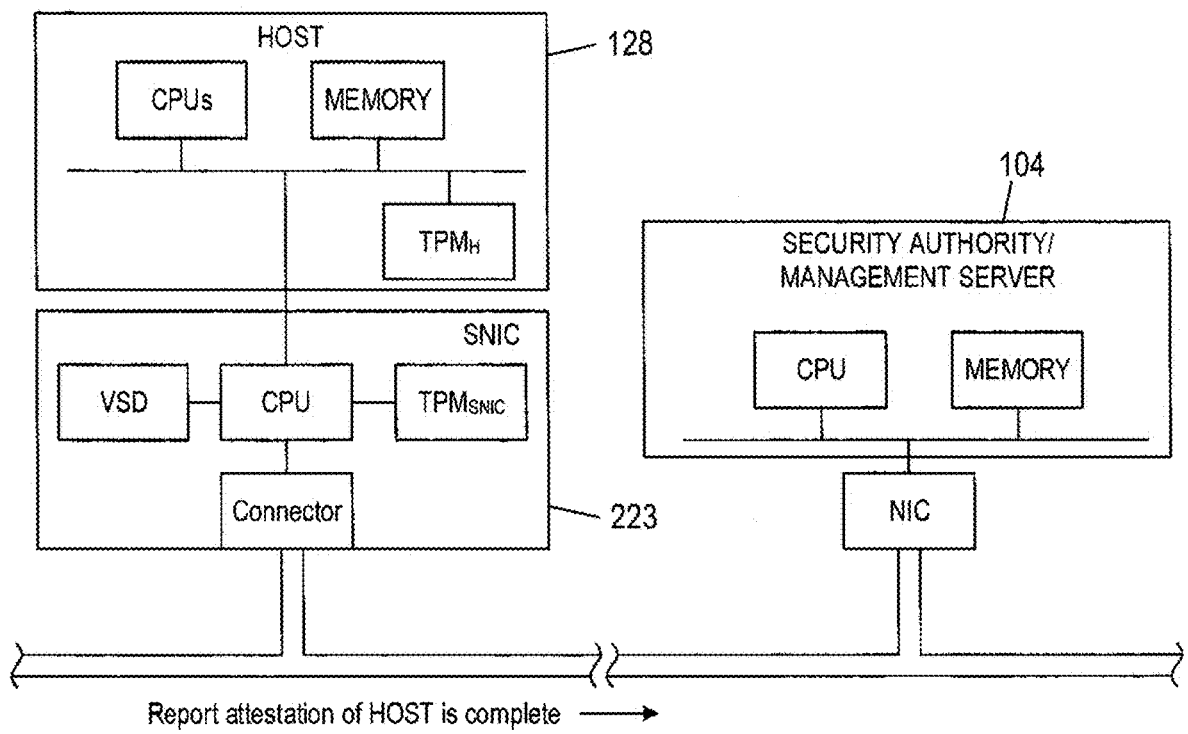

FIG. 9 shows the SNIC 223 sends the report 902 of the results of the attestation of the host 128 to the security authority. The report 902 indicates whether the host 128 has been deemed trustworthy or not. The security authority receives 904 the report from the SNIC 223. If the attestation agent has determined that the host 128 is not trustworthy, the security authority maintains isolation of the host 128 and displays an alert in the management interface of the computer system 106 indicating that the host 128 is not trustworthy and has been denied access to the data center network. If the attestation agent has determined that the host 128 is trustworthy, the security authority may perform an automated operation of opening a communications channel with the host 128 and the host 128 is allowed to broadcast its presence on the data center network. Alternatively, if the attestation agent has determined that the host 128 is trustworthy, the security authority displays an alert in the management user interface of the computer system 106 and a systems administrator performs the operation of opening a communications channel with the host 128 and the host 128 is allowed to broadcast its presence on the data center network. In either implementation, the systems administrator configures the host 128 for addition to the pool resources offered by the data center to data center tenants.

After the host 128 has been deemed trustworthy, utilities of the management server computer 104 perform the operation of integrating the compute and storage resources of the host 128 into one or more resource pools used by tenants with virtual data centers running with the data center. Server computers are grouped together in the data center to provide resource pools to virtual objects, such as virtual machines and virtual networks, running in a virtualization layer. Each cluster provides an aggregated set of resources, such as processors, memory, and disk space (i.e., resource pool) to the virtual objects running in the virtualization layer. The management server computer 104 may execute vSphere® by VMware, Inc. to perform the operation of adding the resources of the host 128 to one or more resource pools of the data center.

Figure 10:
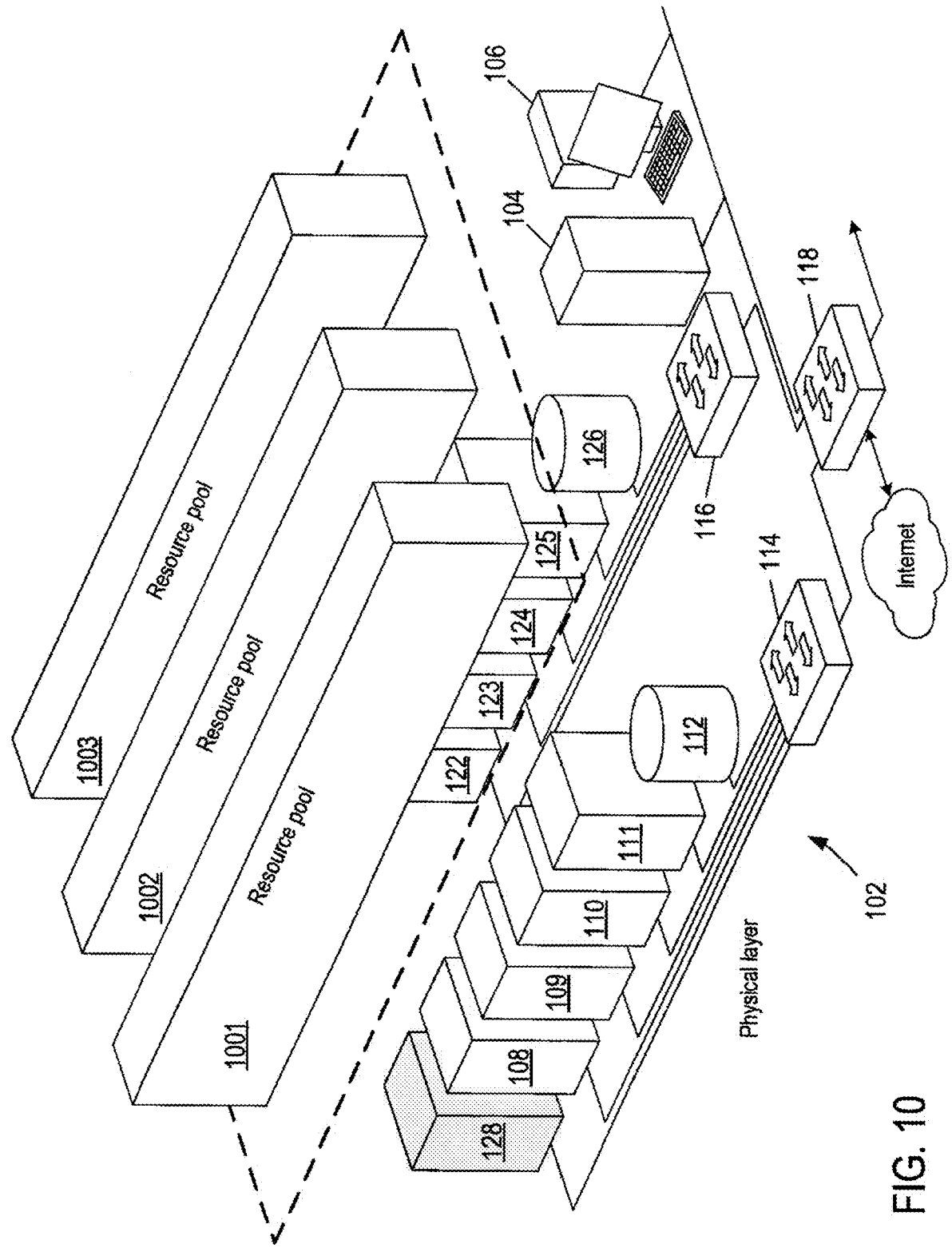
FIG. 10 shows an example of three separate resource pools formed from aggregating processors, memory, and disk space from hosts and data-storage devices of the data center shown in FIG. 1.

FIG. 10 shows an example of three separate resource pools 1001-1003 formed from aggregating different processors, memory, and disk space from the hosts and data-storage devices of the physical data center. In this example, the multiple processors, memory, and disk space of the host 128 are added to one or more of the resource pools 1001-1003. Virtual objects running a virtualization layer (not shown) are assigned different portions of the resources in the resource pools 1001-1003.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A process for attesting to trustworthiness of a host considered for connection to a data center network, the process comprising:
   performing attestation of a smart network interface controller ("SNIC") of the host using a first trusted platform module ("TPM") of the SNIC by a security authority of the data center;
   directing the SNIC to perform attestation of the host when the security authority determines the SNIC is trustworthy;
   performing attestation of the host using a second TPM of the host by the SNIC; and
   connecting the host to the data center network in response to a determination by the SNIC that the host is trustworthy.

2. The process of claim 1 wherein performing attestation of the SNIC comprises:
   requesting an endorsement key ("EK") certificate from the SNIC by the security authority;
   in response to receiving a request for the EK certificate, requesting the EK certificate from the first TPM by the SNIC;
   forwarding the EK certificate from the SNIC to the security authority;
   requesting a platform configuration register ("PCR") value, event log of the SNIC, and an attestation identification key ("AIK") from the SNIC in response to the security authority verifying the EK certificate is authentic;
   in response to receiving a request for the PCR value, the event log of the SNIC, and the AIK, requesting the PCR value and AIK from the first TPM by the SNIC;
   retrieving the event log of the SNIC from memory of the SNIC; and
   forwarding the PCR, the event log of the SNIC, and the AIK from the SNIC to the security authority; and
   verifying trustworthiness of the SNIC based on contents of the PCR, the event log of the SNIC, and the AIK.

3. The process of claim 1 wherein directing the SNIC to perform attestation of the host comprises directing an attestation agent of the SNIC to perform attestation of the host when the security authority determines the SNIC is trustworthy.

4. The process of claim 1 wherein performing attestation of the host comprises:
   requesting an endorsement key ("EK") certificate from the host by the SNIC;
   in response to receiving a request for the EK certificate, requesting the EK certificate from the second TPM by the host;
   forwarding the EK certificate from the host to the SNIC;
   requesting a Platform configuration register ("PCR"), event log of the host, and an attestation identification key ("AIK") from the host in response to the SNIC verifying the EK certificate is authentic;
   in response to receiving a request for the PCR, the event log of the host, and the AIK, requesting the PCR and the AIK from the second TPM by the host;
   retrieving the event log of the host from memory or disk of the host;
   forwarding the PCR, the event log of the host, and the AIK from the host to the SNIC; and
   verifying trustworthiness of the host based on contents of the PCR, the event log of the host, and the AIK.

5. The process of claim 1 wherein performing attestation of the SNIC and attestation of the host comprises isolating the host from the data center network.

6. The process of claim 1 further comprising denying the host access to the data center network when the security authority determines the SNIC is not trustworthy and when the SNIC determines the host is not trustworthy.

7. An automated process for attesting to trustworthiness of a host considered for connection to a data center network, the process comprising:
   performing attestation of a smart network interface controller ("SNIC") of the host using a first trusted platform module ("TPM") of the SNIC;
   performing attestation of the host using a second TPM connected to an internal bus of the host using an attestation agent of the SNIC when the SNIC is deemed trustworthy; and
   connecting the host to the data center network when the attestation agent determines the host is trustworthy.

8. The process of claim 7 wherein performing attestation of the SNIC comprises:
   requesting an endorsement key ("EK") certificate from first TPM of the SNIC;
   requesting a platform configuration register ("PCR") value and an attestation identification key ("AIK") from the first TPM in response to a verification that the EK certificate is authentic;
   requesting an event log of the SNIC from the SNIC; and
   verifying trustworthiness of the SNIC based on contents of the PCR, the event log of the SNIC, and the AIK.

9. The process of claim 7 further comprising directing an attestation agent of the SNIC to perform attestation of the host in response to a determination that the SNIC is trustworthy.

10. The process of claim 7 wherein performing attestation of the host comprises:
    requesting an endorsement key ("EK") certificate from the host by an attestation agent of the SNIC;
    in response to receiving a request for the EK certificate, requesting the EK certificate from the second TPM by the host;
    forwarding the EK certificate from the host to the attestation agent of the SNIC:
    requesting a platform configuration register ("PCR") value and an attestation identification key ("AIK") from the host in response to the attestation agent of the SNIC verifying the EK certificate is authentic;

in response to receiving a request for the PCR and the AIK, requesting the PCR and the AIK from the second TPM by the host;

retrieving the event log of the host from memory or disk of the host;

forwarding the PCR the event log of the host, and the AIK from the host to the attestation agent of the SNIC; and verifying trustworthiness of the host based on contents of the PCR, the event log of the host, and the AIK.

11. The process of claim 7 wherein performing attestation of the SNIC and attestation of the host comprises isolating the host from the data center network.

12. The process of claim 7 further comprising denying the host access to the data center network when the security authority determines the SNIC is not trustworthy and when the SNIC determines the host is not trustworthy.

13. A system comprising:

a host comprising a first trusted platform module ("TPM") connected to an internal bus of the host;

a smart network interface controller ("SNIC") comprising a second TPM, the SNIC having a connection to the internal bus of the host; and a security authority connected to a data center network and connected to the SNIC, wherein the security authority performs attestation of the SNIC using the second TPM to determine trustworthiness of the SNIC and directs the SNIC to perform attestation of the host using the first TPM when the security authority determines the SNIC is trustworthy.

14. The system of claim 13 wherein the SNIC is connected to the internal bus of the host comprises the SNIC located within a housing of the host.

15. The system of claim 13 wherein the SNIC comprises an attestation agent that performs attestation of the host.

16. The system of claim 13 wherein the security authority directs the SNIC to perform attestation of the host using the first TPM comprises the security authority sends instructions to an attestation agent of the SNIC to perform attestation of the host.

* * * * *